Jan. 7, 1958     L. C. LAKE     2,819,114
VERTICALLY SLIDABLE VEHICLE DOOR
Filed July 17, 1956     3 Sheets-Sheet 1

Lawrence C. Lake
INVENTOR.

BY
Attorneys

Jan. 7, 1958 — L. C. LAKE — 2,819,114
VERTICALLY SLIDABLE VEHICLE DOOR
Filed July 17, 1956 — 3 Sheets-Sheet 2

Lawrence C. Lake
INVENTOR.

Jan. 7, 1958   L. C. LAKE   2,819,114
VERTICALLY SLIDABLE VEHICLE DOOR
Filed July 17, 1956   3 Sheets-Sheet 3

Lawrence C. Lake
INVENTOR.

United States Patent Office 2,819,114
Patented Jan. 7, 1958

2,819,114
VERTICALLY SLIDABLE VEHICLE DOOR

Lawrence C. Lake, Kenmore, N. Y.

Application July 17, 1956, Serial No. 598,409

3 Claims. (Cl. 296—44)

This invention relates to motor vehicles and more particularly to body constructions thereof.

An object of the present invention is to provide a body construction for a motor vehicle, that is, an automobile, truck or others, wherein the cross-section of the body is in the form of a curve with the doors slidable up to the top part of the body when the doors are to be opened, whereby there is no door swing in the normal sense. This has the advantage of being able to enter the motor vehicle in a restricted space since it is unnecessary for the door to swing outwardly of the motor vehicle.

A further object of the invention is to provide a motor vehicle body constructed with a curved upper part and having doors which are similarly curved and arranged to overlap each other when in the open position so as to facilitate entry and discharge of passengers, particularly in tight spaces. In addition, the structure in the vehicle body is inherently stronger than present day body styles inasmuch as it is formed as an arch from one side of the body to the other.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a sectional view in enlarged scale taken approximately on the line 4—4 of Figure 1;

Figure 6 is an enlarged sectional view taken on the line 6—6 of Figure 3 and demonstrating the overlapped condition of the doors when they are in the open position;

Figure 7 is an enlarged sectional view taken on the line 7—7 of Figure 1 and showing a lock for one of the doors; and, Figure 8 is a sectional view in enlarged scale taken on the line 8—8 of Figure 3.

Figure 1:
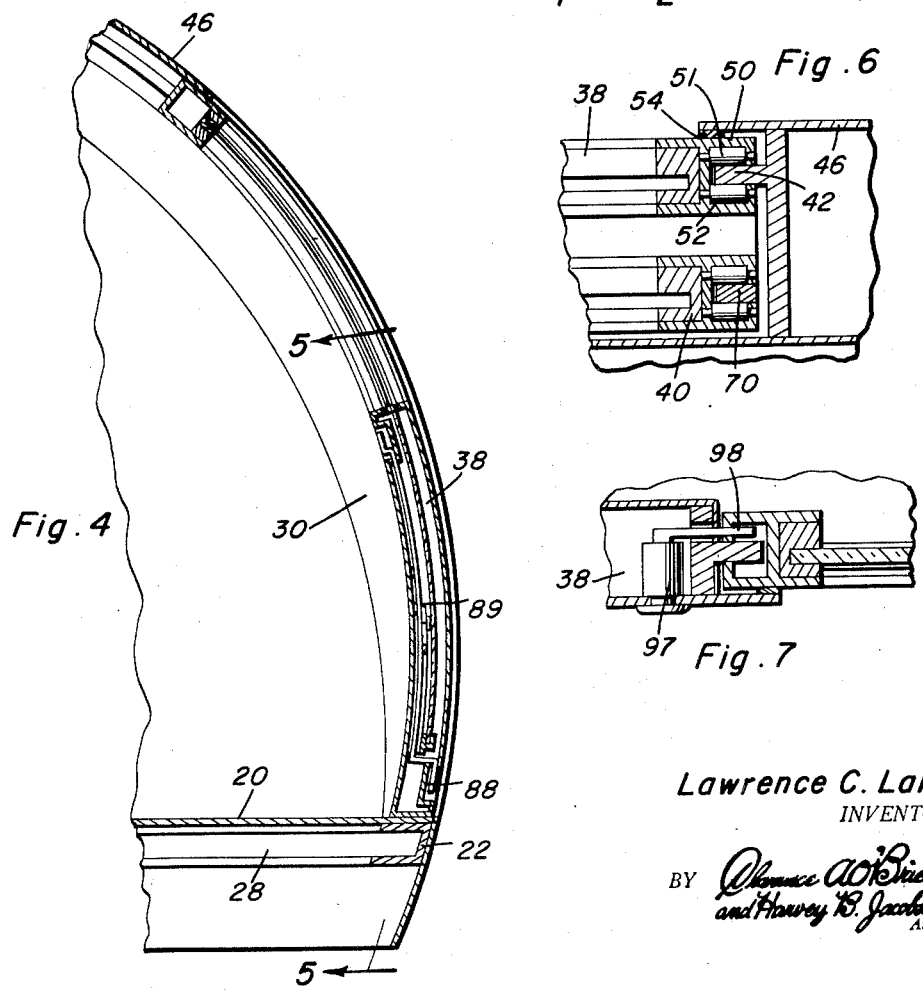
Figure 1 is a fragmentary elevational view of a motor vehicle body constructed in accordance with the principles of the invention and illustrating particularly one door thereof.

In practicing the invention there is a motor vehicle body 10 which is constructed on chassis 12 which may have a pair of channels 14 and 16 extending from front to rear of the motor vehicle as is common in the chassis members of presently available automobiles and trucks. Frame 18 is mounted on and secured to the chassis members and includes a lighter weight group of channels. Floor 20 is mounted on the two side channels 22 and 24 and also the front channel 26 and the rear channel 28. It is understood that the frame will have other braces and structural supports in order to suit the engineering demands to accommodate the running gear of the motor vehicle. In addition, there are arched frame members 30 configured approximately arcuate with the ends welded or otherwise fixed to the side members 22 and 24. The arched frame members 30 constitute a part of the vehicle frame and two of them, namely frame members 32 have door openings therebetween, there being a first and a second door opening 34 and 36, respectively, for the first and second doors 38 and 40.

Figure 2:
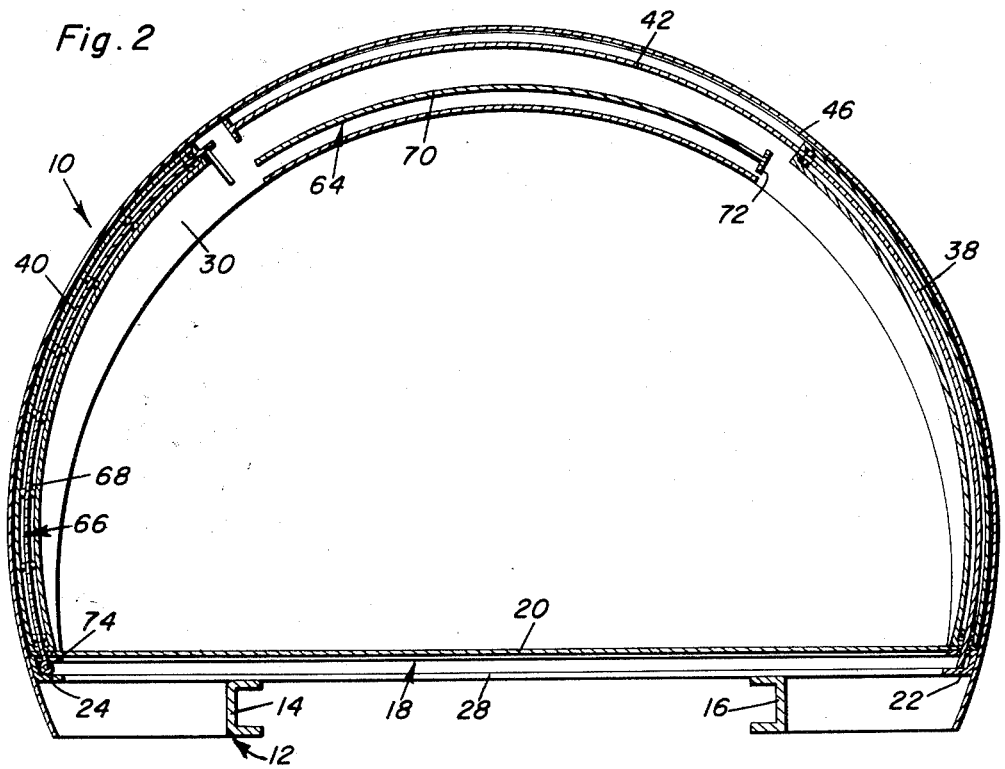
Figure 2 is a transverse sectional view taken on the line 2—2 of Figure 1.
Figure 3:
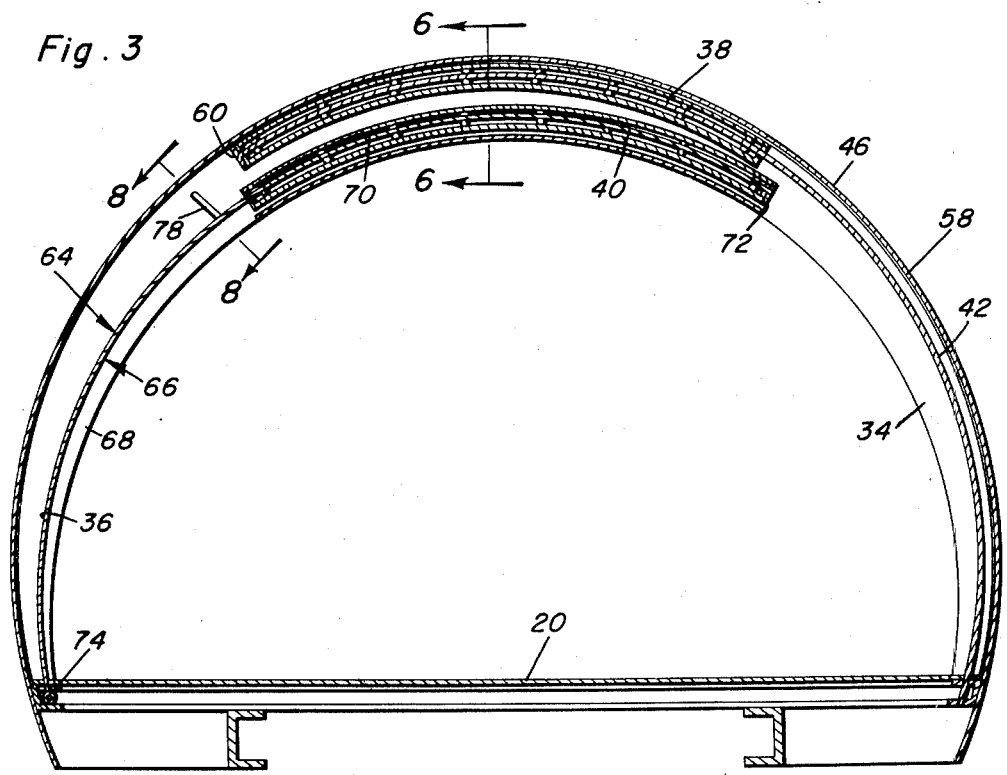
Figure 3 is a sectional view similar to Figure 2 but showing the doors in a second position.
Figure 8:
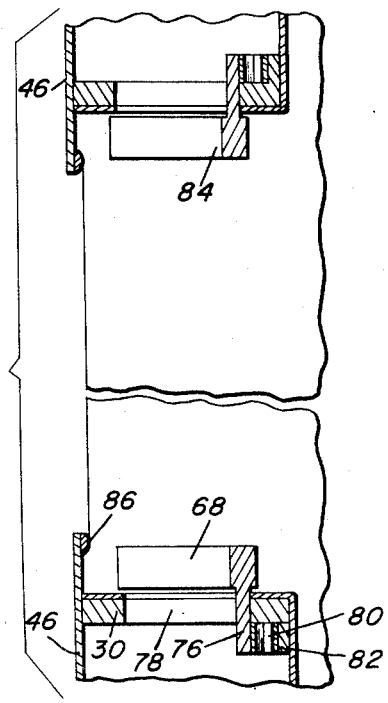

Door opening 34 has a pair of rails 42 and 44 which constitute a first track for the first door 38. The rails are arched or curved with the same general contour as the arched frame members. Door 38 is similarly curved in order to fit flush with the surface of the skin metal 46 of the motor vehicle body. In addition, the door 38 has guides on the opposite sides thereof that are engageable with the track. It is preferred that the guides be constructed of an outwardly opening channel 50 in which there are groups of rollers, as rollers 51 and 52 for one edge of door 38 (Fig. 6). The rollers contact opposite faces of rail 42 of the track in door opening 38. Therefore, the door 38 is constrained in its travel with the rollers providing means to reduce friction in opening and closing the door. Weatherseal 54 is cemented or otherwise fastened to a part of the metal covering of the body which protrudes over and is approximately parallel to the rail 42. As seen in Figures 2 and 3, the rails 42 and 44 which constitute the first track 58 extend upwardly below the roof of the vehicle body and proceed to a point considerably beyond the longitudinal center line of the motor vehicle. This is so that the door 38 passes over center and contacts stop 60 at the outer extremities of track 58. In this way, when the door is opened it will remain in the open position by being held by gravity against stops 60.

The door is movable on track 64, the latter consisting of two rails, one being on arched frame member 30 while the other is on the frame member ahead of it. The rail 66 (Fig. 2) is made of two sections 68 and 70, respectively. The upper section 70 is parallel to the upper part of the rail 42 and has a stop 72 at its outer extremity. Rail section 68 is mounted on a pivot 74 at its lower extremity, the pivot being carried by channel 24. Rail 68 has an arm 76 projecting laterally from its upper end and passing through a slot 78 in the arched frame member 34. Spring 80 reacts on arm 76 and on a lip 82 projecting from the arched frame member 30 and constantly biases the rail 68 laterally outwardly of the vehicle body so as to hold the door 40 flush with the outer contour of the vehicle body. An identical construction is on the opposite side of the door 40, that is, there is an additional rail 84 identical to rail 68, rails 68 and 84 cooperating to form the track on which the door 40 is slidable. Weatherseal 86 is cemented or otherwise attached to a part of the skin metal of the body which overlies the rails 68 and 84 and functions to prevent drafts and leakage through the door.

Figure 5:
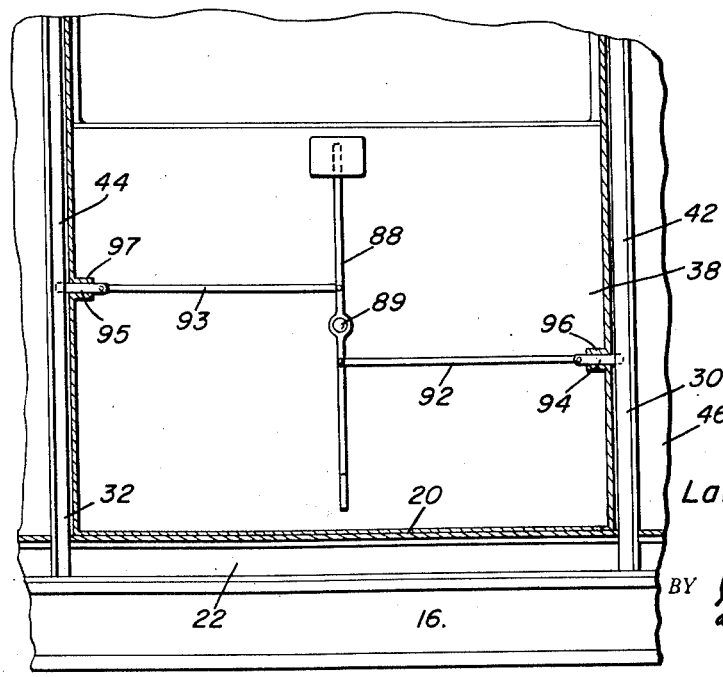
Figure 5 is a sectional view taken on the line 5—5 of Figure 4.

It is preferred that the doors be made of lightweight construction and therefore an operating lever 88 is mounted on a center pivot 89 in a typical door, for example, door 38 (Fig. 5). The upper extremity of the lever 88 is accessible from the interior of the motor vehicle, while there is a recess 91 on the outside of the door (Fig. 1) into which the lower extremity of the lever 88 projects. By oscillating the lever links 92 and 93 are reciprocated these links having at their extremities latch keepers 94 and 95 which are constrained by guides 96 and 97 to enter or be withdrawn from slots in the track for the door. A door lock 97 that is key controlled, is carried by the door and has its locking element 98 passed through slots in the side of the door and in the arched rib 30.

In use, the motorist or passenger desiring to enter the motor vehicle merely lifts the door upward, sliding it on its track until it reaches the topmost position. To withdraw the door, it is merely pulled down. In order to operate door 40, the passenger or motorist must first push the top part in slightly so as to bring the sections 63 and 70 in alignment and then the door 40 is lifted, sliding it parallel to the roof of the motor vehicle and in a nested relationship with the other door.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a vehicle body adapted to be mounted on a chassis, sides which are curved in cross-section and which have an outer skin, each side having a door opening, a first and a second door in said openings, a fixed track in one opening on which said first door is slidable upwardly and downwardly of the body, a second track having a section in said second opening on which said second door is slidable, said section being pivotally connected to said body, said second track having a second section offset from said first-mentioned section so that the pivoted section is movable to align therewith in order to slide said second door to an open position so as to allow said first door and said second door to be in superposed relation to each other in a raised position and fit flush with the skin when in a closed position.

2. In a vehicle body adapted to be mounted on a chassis, sides which are curved in cross-section and which have an outer skin, each side having a door opening, a first and a second door in said openings, a fixed track in one opening on which said first door is slidable upwardly and downwardly of the body, a second track having a section in said second opening on which said second door is slidable, said section being pivotally connected to said body, said second track having a second section offset from said first-mentioned section so that the pivoted section is movable to align therewith in order to slide said second door to an open position so as to allow said first door and said second door to be in superposed relation to each other in a raised position and fit flush with the skin when in a closed position, said second section being superposed with a part of said first track at the top of the body.

3. In a vehicle body adapted to be mounted on a chassis, sides which are curved in cross-section and which have an outer skin, each side having a door opening, a first and a second door in said openings, a fixed track in one opening on which said first door is slidable upwardly and downwardly of the body, a second track having a section in said second opening on which said second door is slidable, said section being pivotally connected to said body, said second track having a second section offset from said first-mentioned section so that the pivoted section is movable to align therewith in order to slide said second door to an open position, and means including a spring reacting on said first door to hold said first door fitting flush with the skin of the body and to hold the pivoted track section offset from said second section when said first door is in a closed position.

References Cited in the file of this patent
UNITED STATES PATENTS

| | | |
|---|---|---|
| 498,071 | Moore | May 23, 1893 |
| 2,651,541 | Surles | Sept. 8, 1953 |

FOREIGN PATENTS

| | | |
|---|---|---|
| 225,087 | Switzerland | Apr. 1, 1943 |
| 1,026,247 | France | Feb. 4, 1953 |